United States Patent
Mullin et al.

(10) Patent No.: US 9,545,082 B1
(45) Date of Patent: Jan. 17, 2017

(54) PET TOY LAUNCHING SYSTEM AND METHOD FOR USE WITH MOBILE DEVICES

(71) Applicant: Make Ideas, LLC, La Jolla, CA (US)

(72) Inventors: Keith Alan Mullin, La Jolla, CA (US); Loren Taylor, Chatham Township, NJ (US)

(73) Assignee: Make Ideas, LLC, La Jolla, CA (US)

( * ) Notice: Subject to any disclaimer, the term of this patent is extended or adjusted under 35 U.S.C. 154(b) by 0 days.

(21) Appl. No.: 14/673,361

(22) Filed: Mar. 30, 2015

Related U.S. Application Data

(60) Provisional application No. 61/971,680, filed on Mar. 28, 2014.

(51) Int. Cl.
*A01K 15/02* (2006.01)
*F41B 3/00* (2006.01)

(52) U.S. Cl.
CPC ............. *A01K 15/02* (2013.01); *A01K 15/021* (2013.01); *F41B 3/00* (2013.01)

(58) Field of Classification Search
CPC .... A63B 2208/14; A01K 15/02; A01K 15/021
See application file for complete search history.

(56) References Cited

U.S. PATENT DOCUMENTS

| | | | |
|---|---|---|---|
| 2006/0011145 A1* | 1/2006 | Kates ................... | A01K 15/021 119/719 |
| 2013/0104869 A1* | 5/2013 | Lewis .................... | A63B 69/40 124/78 |

* cited by examiner

*Primary Examiner* — Andrew Bee
(74) *Attorney, Agent, or Firm* — Tillman Wright, PLLC; James D. Wright; David R. Higgins

(57) ABSTRACT

A pet toy launching system for use with mobile devices includes a ball launcher, a dog-wearable sensing apparatus, a ball or other projectile, a mobile device, and one or more sensors. Each of the ball launcher, the dog-wearable sensing apparatus, and the ball or other projectile includes a transmitter. Each sensor is disposed in, and is electrically connected to the transmitter in, one of the ball launcher, the dog-wearable sensing apparatus, and/or the ball. The mobile device communicates with at least one of the ball launcher, the dog-wearable sensing apparatus, and/or the ball. The application software program presents a user interface, to a user, such that a game may be carried out, via the application software program, when the dog-wearable sensing apparatus is worn by a dog and the ball launcher is utilized to launch the ball or other projectile for the dog to retrieve.

6 Claims, 20 Drawing Sheets

PET TOY LAUNCHING SYSTEM AND METHOD FOR USE WITH MOBILE DEVICES

CROSS-REFERENCE TO RELATED APPLICATION

The present application is a U.S. nonprovisional patent application of, and claims priority under 35 U.S.C. §119(e) to, U.S. provisional patent application Ser. No. 61/971,680, filed Mar. 28, 2014, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to software and electronic devices for enhancing interaction between a dog and its owner, and, in particular, to a pet toy launching system and method for use with mobile devices.

Background

Dogs enjoy fetching objects, including sticks, balls, Frisbees, and/or just about anything their human parents (owners) throw to them in fetch play.

Tennis balls are one of the dog industry products used most frequently by pet owners in playing fetch with their dogs. Specific devices have been invented for dog owners to throw or launch a tennis ball in fetch play. Such devices include the Bark N Bat®, available from Hyper Products of Wichita, Kans., the Chuckit!®, available from Doskocil Manufacturing Company, Inc. dba Petmate® of Arlington, Tex.; the iFetch® Ball Launcher, available from iFetch, LLC of Austin, Tex.; the Wood Chuck® Dog Ball Thrower, available from Planet Ventures, Inc. of Westbrook, Me.; the GoDogGo® Fetch Machine, available from Thompson Concept and Design, Inc. of Gig Harbor, Wash.; and other such manual or mechanical ball launching devices. These devices are used during dog fetch play and typically provide hands free pick-up of a ball, can throw a ball great distances and help with exercising the dog with repetitive and long distance running and fetching.

However, with all the activity and play that occurs during fetching, there does not exist a product which tracks throw and fetch data nor includes gamification of fetch play. With the advent of wireless communication, such as Bluetooth, data can be generated during fetch play via sensors, which can integrate and operate a software program located on a smartphone, computer or the internet.

SUMMARY OF THE PRESENT INVENTION

Broadly defined, the present invention according to one aspect is a pet toy launching system for use with mobile devices, including: a ball launcher, including a transmitter; a dog-wearable sensing apparatus, including a transmitter; a ball or other projectile, including a transmitter; a mobile device, on which an application software program is installed; and one or more sensors, each of which is disposed in, and electrically connected to the transmitter in, one of the ball launcher, the dog-wearable sensing apparatus, and/or the ball; wherein the mobile device communicates with at least one of the ball launcher, the dog-wearable sensing apparatus, and/or the ball; and wherein the application software program presents a user interface, to a user, such that a game may be carried out, via the application software program, when the dog-wearable sensing apparatus is worn by a dog and the ball launcher is utilized to launch the ball or other projectile for the dog to retrieve.

Broadly defined, the present invention according to another aspect is a pet toy launching system for use with mobile devices, including: a ball launcher; a sensor unit that may be attached to the ball launcher and that includes a transmitter; a dog-wearable sensing apparatus, including a transmitter; a ball or other projectile, including a transmitter; a mobile device, on which an application software program is installed; and one or more sensors, each of which is disposed in, and electrically connected to the transmitter in, one of the ball launcher sensor unit, the dog-wearable sensing apparatus, and/or the ball; wherein the mobile device communicates with at least one of the ball launcher sensor unit, the dog-wearable sensing apparatus, and/or the ball; and wherein the application software program presents a user interface, to a user, such that a game may be carried out, via the application software program, when the dog-wearable sensing apparatus is worn by a dog, the sensor unit is attached to the ball launcher, and the ball launcher is utilized to launch the ball or other projectile for the dog to retrieve.

Broadly defined, the present invention according to another aspect is a pet toy launching system for use with mobile devices, including: a ball launcher, including a sensor and a transmitter, the sensor being electrically connected to the transmitter; a ball or other projectile; and a mobile device, on which an application software program is installed; wherein the mobile device communicates with the ball launcher; and wherein the application software program presents a user interface, to a user, such that a game may be carried out, via the application software program, when the ball launcher is utilized to launch the ball or other projectile for the dog to retrieve.

Broadly defined, the present invention according to another aspect is a pet toy launching system for use with mobile devices, including: a ball launcher; a dog-wearable sensing apparatus, including a sensor and a transmitter, the sensor being electrically connected to the transmitter; a ball or other projectile; and a mobile device, on which an application software program is installed; wherein the mobile device communicates with the dog-wearable sensing apparatus; and wherein the application software program presents a user interface, to a user, such that a game may be carried out, via the application software program, when the dog-wearable sensing apparatus is worn by a dog and the ball launcher is utilized to launch the ball or other projectile for the dog to retrieve.

Broadly defined, the present invention according to another aspect is a pet toy launching system for use with mobile devices, including: a ball launcher; a ball or other projectile, including a sensor and a transmitter, the sensor being electrically connected to the transmitter; and a mobile device, on which an application software program is installed; wherein the mobile device communicates with the ball; and wherein the application software program presents a user interface, to a user, such that a game may be carried out, via the application software program, when the ball launcher is utilized to launch the ball or other projectile for the dog to retrieve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
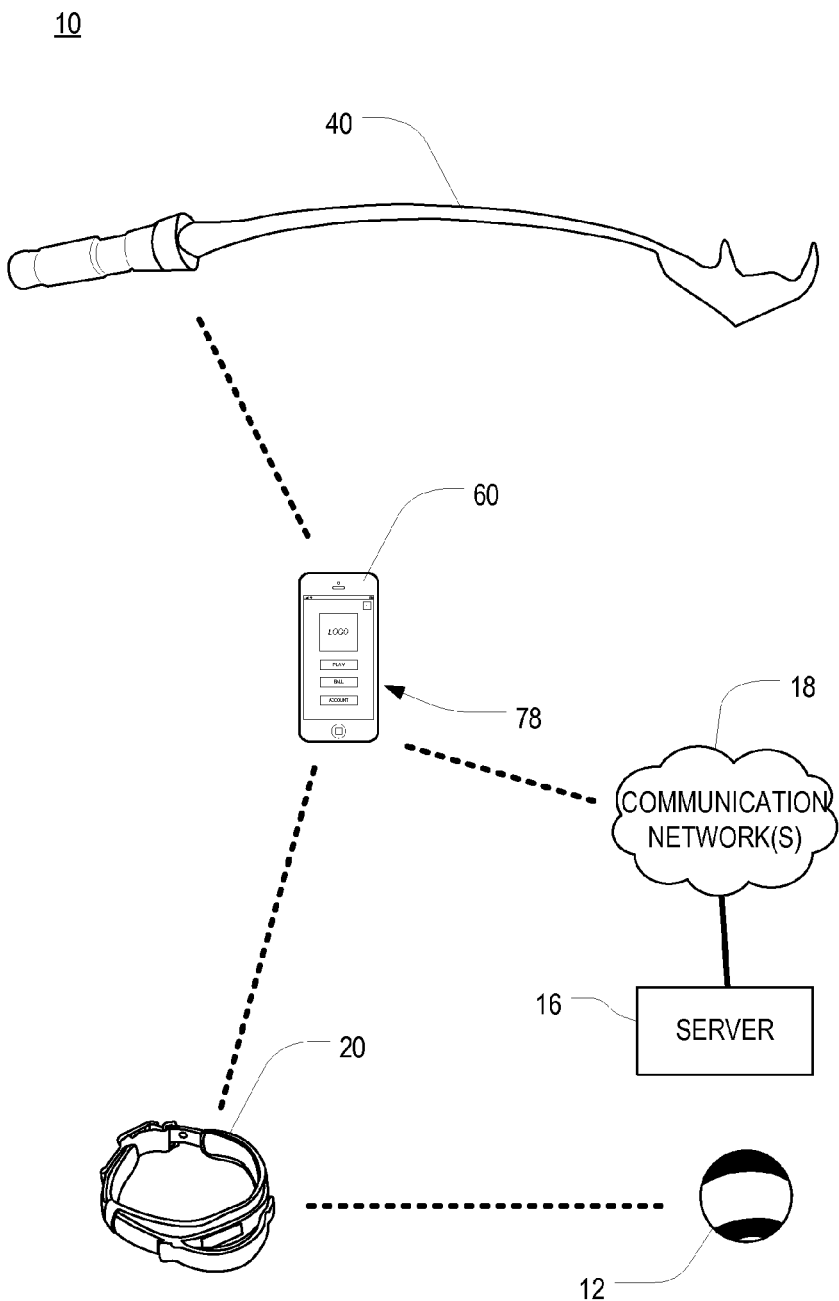
FIG. 1 is a view of a pet toy launching system for use with mobile devices in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

Figure 2:
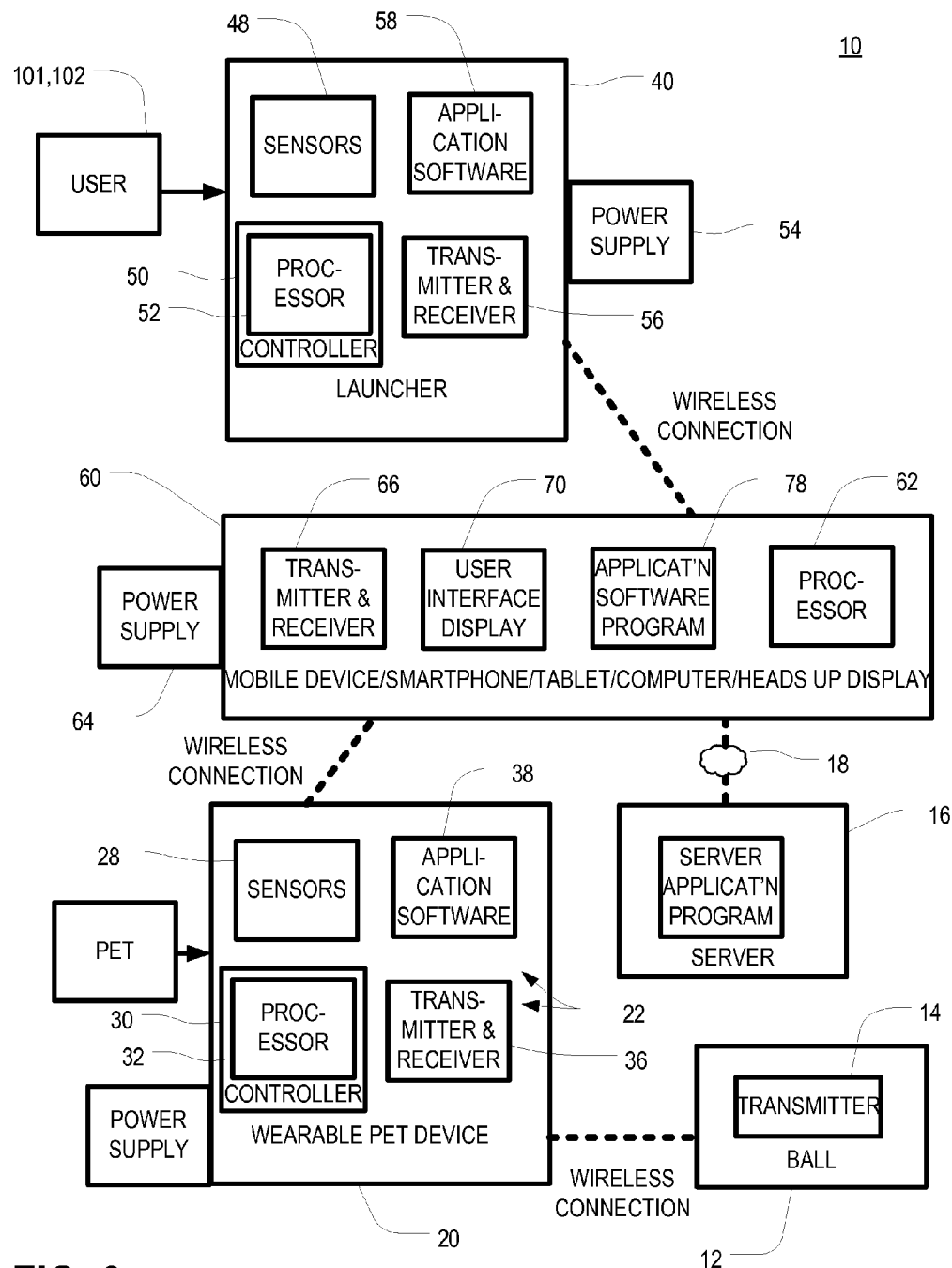
FIG. 2 is a block diagram of the system of FIG. 1.

FIG. 1 is a view of a pet toy launching system 10 for use with mobile devices 60 in accordance with one or more preferred embodiments of the present invention, and FIG. 2 is a block diagram of the system 10 of FIG. 1. As shown therein, the pet toy launching system 10 includes a sensing ball or other projectile 12, a dog-wearable sensing apparatus 20, a ball launcher 40, a mobile device 60, on which an application software program 78 is installed, and a server 16 that may accessed via one or more communication network 18, which in at least some embodiments includes the internet.

The mobile device 60 shown in FIG. 1 may be any suitable mobile device, including a smartphone (such as the illustrated iPhone®), tablet, notebook or other computer, heads up display device, or the like. As shown in FIG. 2, the mobile device 60 preferably includes a processor 62, a power supply 64 (which may be internal or external), at least one transmitter and receiver and/or transceiver 66, and a user interface display 70. A keypad and/or other user input devices (not shown) may also be included. Application software 78 is also provided for execution by the processor 62. The mobile device 60 preferably communicates with the server 16 via any available communication network 18 as well as with one or more of the other components of the system 10. In the illustrated embodiment, the mobile device 60 may communicate to or with the ball launcher 40, as well as the dog-wearable sensing apparatus 20, via wireless connection(s). In other embodiments (not shown), the mobile device 60 may additionally or alternatively communicate to or with the sensing ball 12 via wireless connection.

Figure 3:
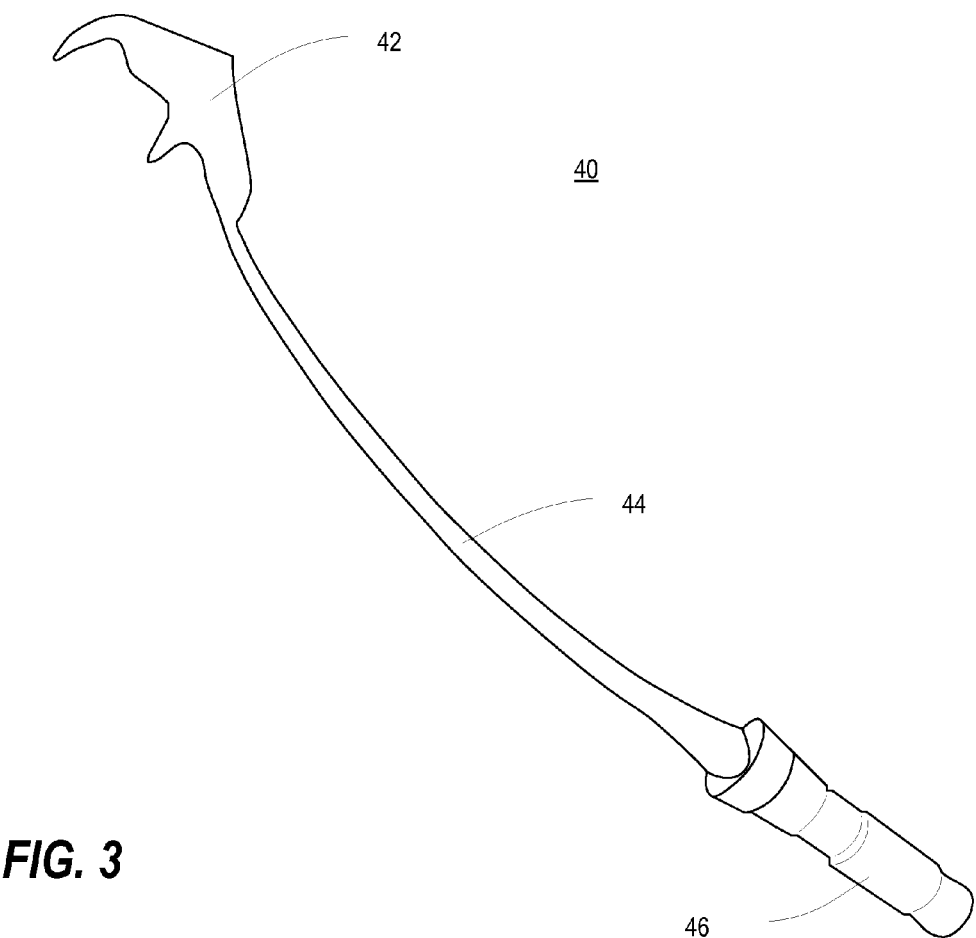
FIG. 3 is an enlarged perspective view of the ball launcher of FIG. 1.

FIG. 3 is an enlarged perspective view of the ball launcher 40 of FIG. 1. The illustrated ball launcher 40, which may sometimes be referred to herein as a "wand," includes a ball holder 42, a shaft 44, and a handle 46 containing a compartment (not shown). It will be appreciated that the particular ball launcher 40 shown in FIG. 3 is exemplary only, and that the shape, dimensions, elements, and general form factor of the ball launcher may be varied considerably without departing from the scope of the present invention. For example, the ball launcher 40 may take the form of a bat, paddle, tennis racket, lacrosse stick, cesta, scoop, slingshot, or the like, or alternatively may be in some cases be an automatic launching device, such as a tennis ball launcher or other specialized projectile launching device. As shown in FIG. 2, the ball launcher 40 preferably includes one or more sensors 48, one or more controllers 50 (each including a processor 52), a power supply 54 (which may be internal or external), and at least one transmitter and receiver and/or transceiver 56, some or all of which may be housed in the compartment in the handle 46. Application software 58, microcode or the like is also provided for execution by the processor 52. In the illustrated embodiment, the ball launcher 40 may communicate to or with the mobile device 60 via wireless connection. In other embodiments (not shown), the ball launcher 40 may additionally or alternatively communicate to or with the dog-wearable sensing apparatus 20 and/or the sensing ball 12 via wireless connection.

Figure 4:
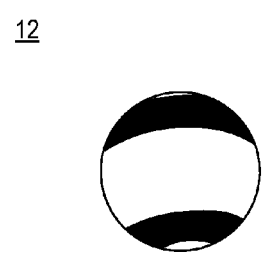
FIG. 4 is an enlarged view of the ball of FIG. 1.

FIG. 4 is an enlarged view of the sensing ball 12 of FIG. 1. The illustrated sensing ball 12 is a generally spherical, decorative ball. It will be appreciated, however, that the particular sensing ball 12 shown in FIG. 4 is exemplary only, and that the shape, dimensions, elements, and general form factor of the sensing ball 12, as well as any decorative features, may be varied considerably without departing from the scope of the present invention. For example, the ball may be round (spherical) (with or without perforations), or it may be a flying disc (with or without perforations), or it may be a spheroid (sphere-like but not spherical), or it may take various abstract shapes, or it may be a whimsical or cartoon character (with or without an area for wand attachment) or the like. As shown in FIG. 2, the sensing ball 12 preferably includes at least a transmitter 14. Although not specifically illustrated, it may also include a receiver (and/or a transceiver), one or more sensors, one or more controllers (each of which may include a processor), and/or a power supply (which may be internal or external). In the illustrated embodiment, the sensing ball 12 may communicate to or with the dog-wearable sensing apparatus 20 via wireless connection. In other embodiments (not shown), the sensing ball 12 may additionally or alternatively communicate to or with the mobile device 60 and/or the ball launcher 40 via wireless connection.

Figure 5:
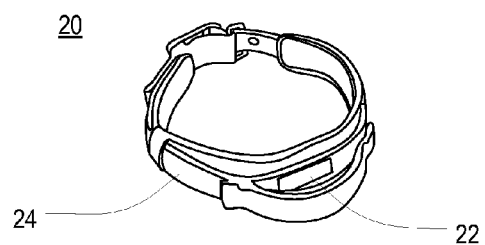
FIG. 5 is a perspective view of the dog-wearable sensing apparatus of FIG. 1.
Figure 6:
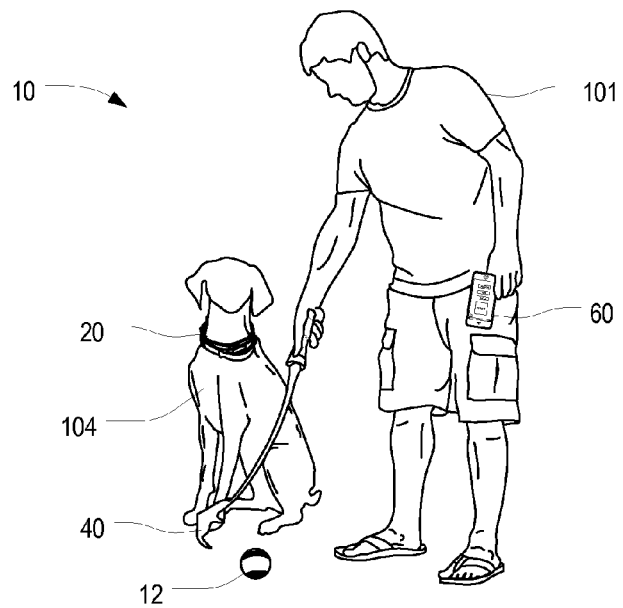
FIG. 6 is an environmental view of a user picking up or retrieving a ball as part of a method of using the system of FIG. 1 in accordance with one or more preferred embodiments of the present invention.

FIG. 5 is a perspective view of the dog-wearable sensing apparatus 20 of FIG. 1. As shown therein, the dog-wearable sensing apparatus 20 includes a sensor package 22 carried on a collar 24. In other embodiments, the wearable sensing apparatus is a standalone, detachable device that can be attached to, and detached from, a conventional dog collar or other wearable dog apparatus, such as dog collars, dog harnesses, dog backpacks, dog life-preservers and the like, thereby making any such wearable dog equipment smart-enabled.

As shown in FIG. 2, the sensor package 22 preferably includes one or more sensors 28, one or more controllers 30 (each including a processor 32), a power supply 34 (which may be internal or external), and at least one transmitter and receiver and/or transceiver 36. Application software 38 is also provided for execution by the processor 32. In the illustrated embodiment, the dog-wearable sensing apparatus 20 may communicate to or with the mobile device 60, as well as the sensing ball 12, via wireless connection(s). In other embodiments (not shown), the dog-wearable sensing apparatus 20 may additionally or alternatively communicate to or with the ball launcher 40 via wireless connection.

Use of the system 10 involves a user 101,102 throwing or otherwise launching a sensing ball 12 for the user's dog 104 to retrieve and using the mobile device 60 and an application software program 78 installed thereon to manage one or more game or other tracking software program based on the throwing and retrieving of the sensing ball 12 by the dog 104. In at least some of these embodiments, the ball launcher 40 is used to throw or launch the sensing ball 12, and in at least some of these embodiments, the ball launcher 40 may also be utilized to lift the sensing ball 12 from the ground so that it need not be touched by the user's hand. By way of example, FIG. 1 is an environmental view of a user 101 picking up or retrieving a sensing ball 12 as part of a method of using the system 10 of FIG. 1 in accordance with one or more preferred embodiments of the present invention. In particular, the user 101 is holding the ball launcher 40 by the handle 46 and using the ball holder 42 to scoop a sensing ball 12 up so that it can be cradled therein. For convenience, the user 101 is holding the mobile device 60 in his left hand during this process, but it is also possible, for example, to set the mobile device 60 aside or to place it in a pocket in the user's pants or shirt, while picking the sensing ball 12 up.

Figure 7:
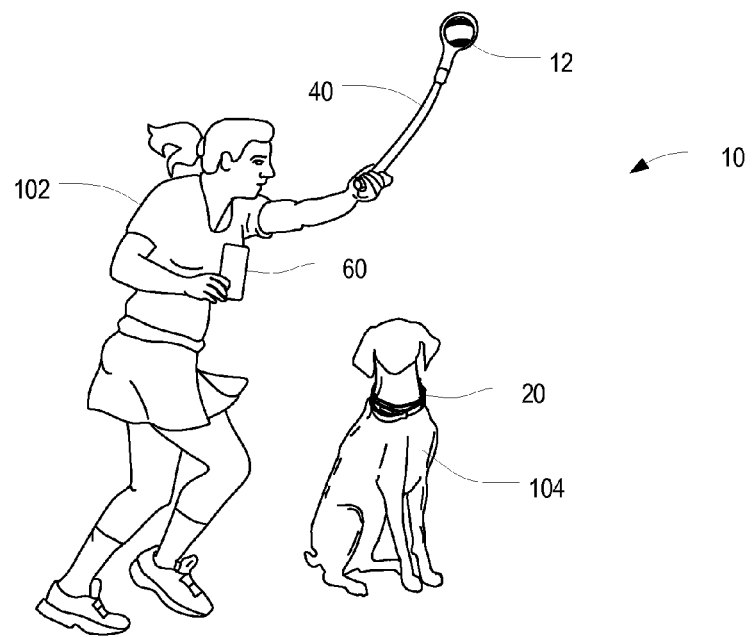
FIG. 7 is an environmental view of a user throwing a spheroid projectile in accordance with a method of using the system of FIG. 1 in accordance with one or more preferred embodiments of the present invention.

FIG. 7 is an environmental view of a user 102 throwing a spheroid projectile 12 in accordance with a method of using the system 10 of FIG. 1 in accordance with one or more preferred embodiments of the present invention. In particular, the user 102 is holding the ball launcher 40 by the handle 46, with the sensing ball 12 still cradled in the ball holder 42, and whipping the launcher 40 forward such that the sensing ball 12 is thrown or launched from the ball holder 42 to achieve a desired trajectory and travel distance. Assuming the dog 104 is trained to do so, the intent is for the dog 104 to follow the sensing ball 12 (or in some cases to intercept that sensing ball 12 along its trajectory) and return or fetch the sensing ball 12 to the user 101,102.

In summary, the ball launchers described herein are used to launch balls and other projectiles. Sensors are preferably used to gather data that is transmitted to the mobile device for processing and display of programs by the mobile device's software. In at least some embodiments, the ball launcher gathers, acquires and transmits data while it is being used by the user. A wearable device may be worn by the dog or other pet and has sensors which gather and transmit data for use by the mobile device for processing by the mobile device's software. The ball or projectile may also transmit or emanate a signal that may be used by a sensor device, such as may be installed on the pet's wearable device, to determine, by way of example, the projectile's location, throw velocity, orientation, or the like. The user may interact with the display on the mobile device which is generated in part and manipulated by the data provided by the launcher in a static or dynamic manner. The launcher device is preferably able to grasp, pick-up and launch/throw a projectile without the user touching the projectile with their hands.

Figure 8:
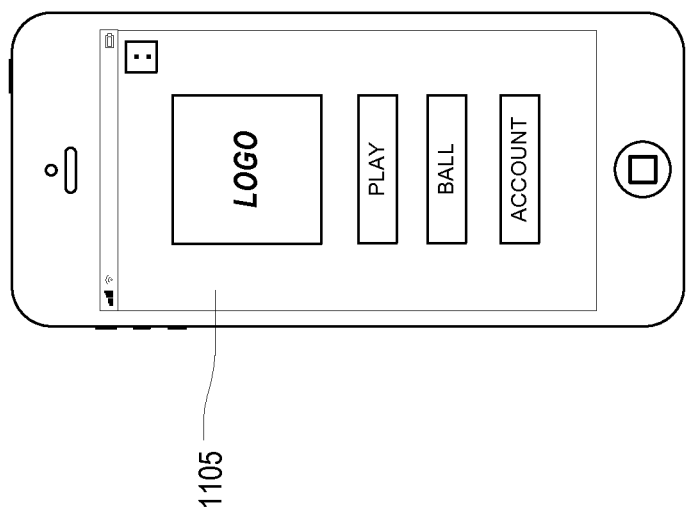
FIG. 8 is a front view of the mobile device of FIG. 1, shown with an exemplary graphical user interface operating thereon.

The mobile device 60 and the application software program 78 installed thereon manage data related to the throw and retrieval process using the various OEM and other sensors, controllers, processors, transmitters, receivers, and the like described herein. The application software program 78 includes a graphical user interface as well as other elements. In this regard, FIG. 8 is a front view of the mobile device 60 of FIG. 1, shown with an exemplary graphical user interface operating thereon. In particular, an entry screen 1105 is shown displayed thereon. The entry screen 1105 and other screens are described hereinbelow together with some or all of the functionality of the user interface.

Figure 9:
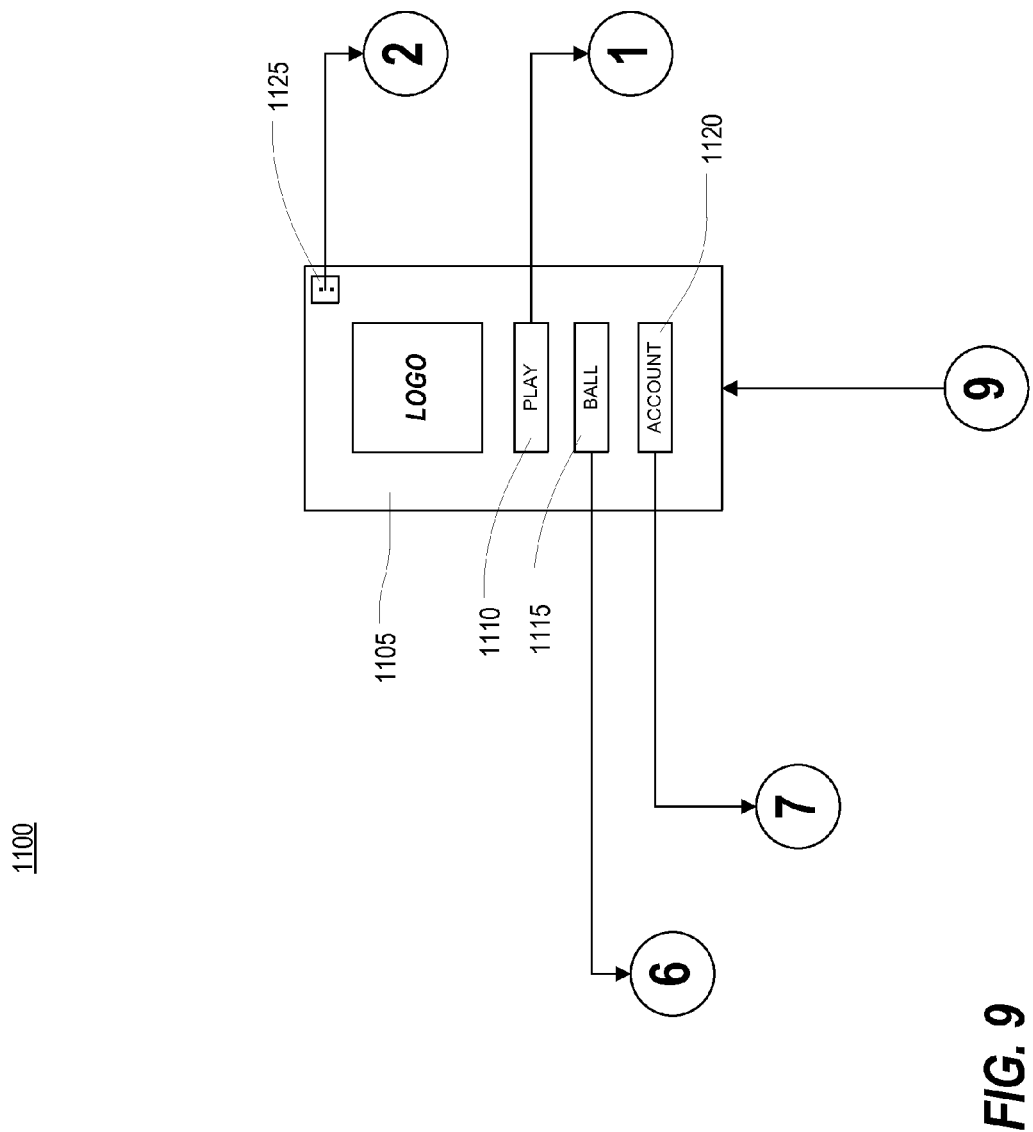
FIG. 9 is a partial wireframe diagram for an entry screen portion of the exemplary user interface.

FIG. 9 is a partial wireframe diagram for an entry screen portion 1100 of the exemplary user interface. As shown therein, the entry screen portion 1100 preferably includes the entry screen 1105 shown in FIG. 8. The entry screen 1105 preferably provides selectable functionality that enables a user to play a game via button 1110, select a ball via button 1115, review account information via button 1120, or access more information and/or functionality via button 1125.

Figure 10:
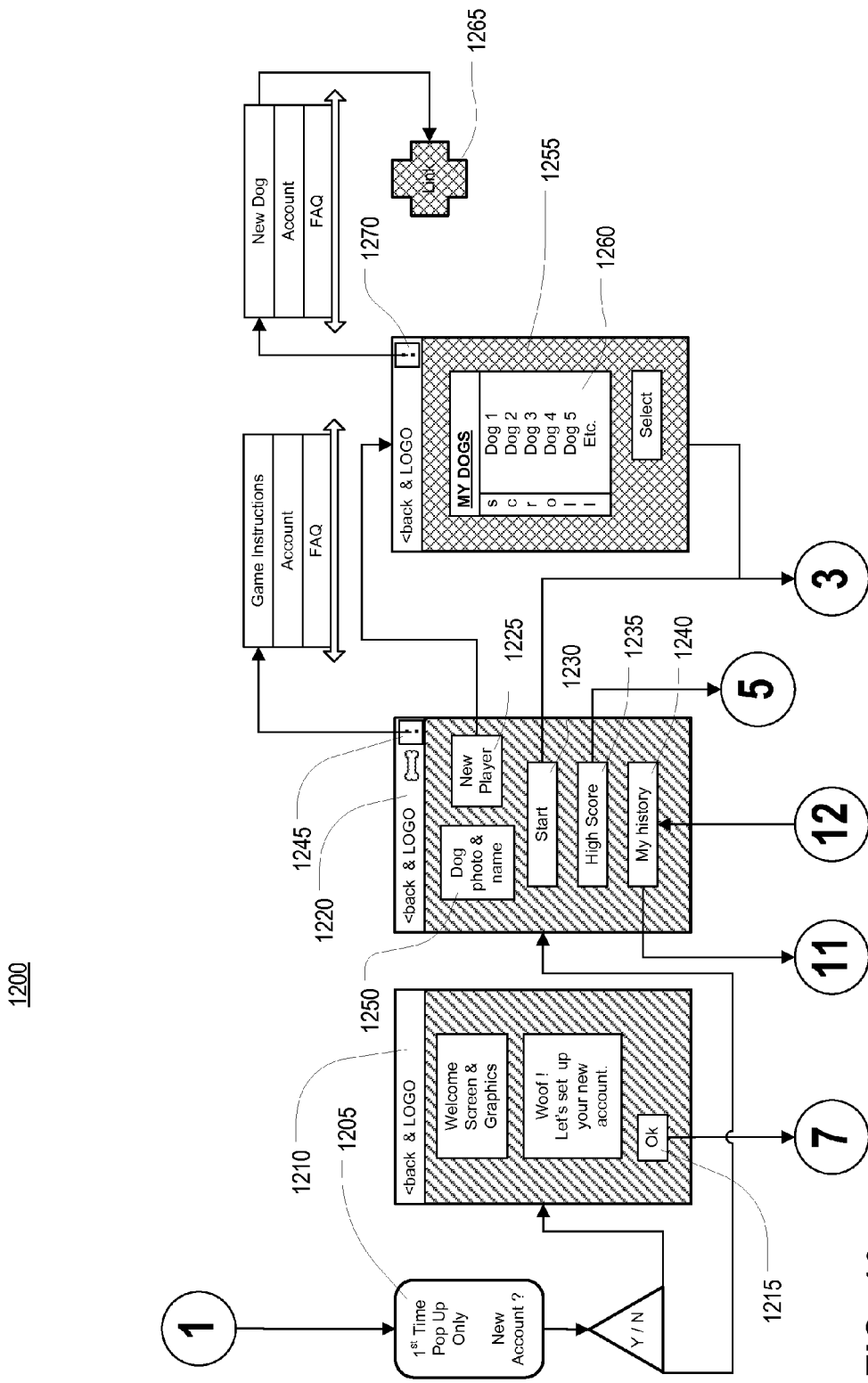
FIG. 10 is a partial wireframe diagram for a play management portion of the exemplary user interface.

FIG. 10 is a partial wireframe diagram for a play management portion 1200 of the exemplary user interface. The play management portion 1200 may be accessed at least by selecting the appropriate button 1110 on the entry screen 1105 shown in FIG. 11. A popup 1205 may appear the first time the play management portion 1200 is executed to welcome a new user via a welcome screen 1210 and direct them to set up a new account by selecting an appropriate button 1215 thereon. Otherwise, a play management home screen 1220 may be displayed as described below.

Figure 15:
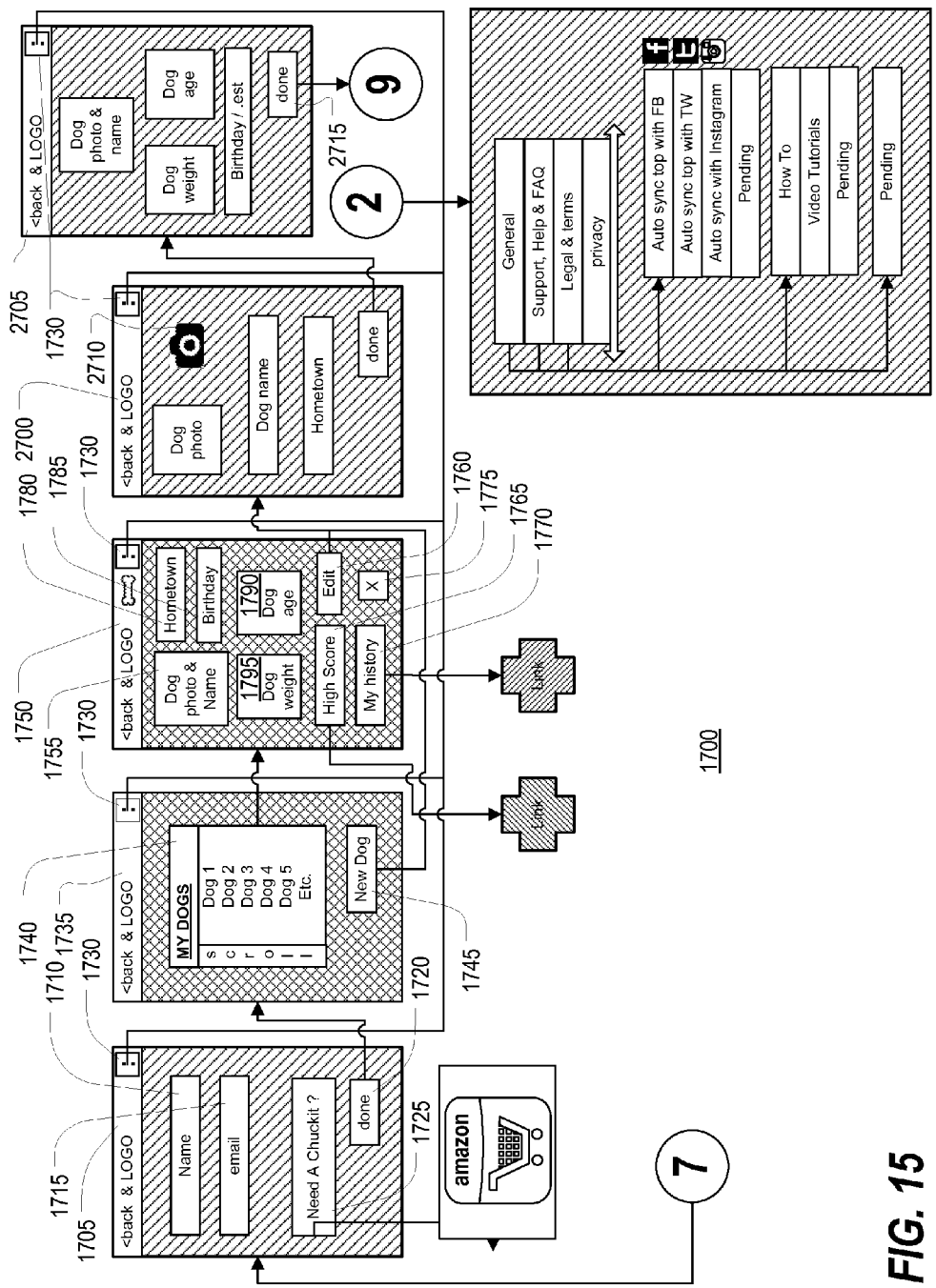
FIG. 15 is a partial wireframe diagram for an account and admin portion of the exemplary user interface.

When a new user chooses to set up an account by selecting the appropriate button 1215 on the welcome screen 1210, operation is transferred to an account and admin portion 1700. In this regard, FIG. 15 is a partial wireframe diagram for an account and admin portion 1700 of the exemplary user interface. When the account and admin portion 1700 is entered, a login screen 1705 may be displayed. Credential information such as a user name and/or email address may be supplied via respective input fields 1710,1715 and, once verified, account information for the entered user may be accessed via a selectable button designated "done" or the like 1720. It will be appreciated that other credential information may alternatively or additionally be required. The login screen 1705 may also provide selectable functionality that enables a user to order game play components and accessories via button 1725 or access more information and/or functionality via button 1730. Merchandise ordering functionality may be provided, for example, via Amazon®.

Once credential information is verified, a dog info management screen 1735 may be displayed. The dog info management screen 1735 preferably includes selectable functionality that enables a user to choose (select) a dog from a list 1740 of previously-input dogs or to input information about a new dog via button 1745. If a dog is selected from the list 1740, a dog information screen 1750 may be displayed. The dog information screen 1750 preferably includes an image 1755 of the selected dog together with the dog's name and includes selectable functionality to enable the user to edit information about the selected dog via button 1760, review previous high score data for the dog via button 1765, review information and/or data about previous games via button 1770, delete the selected dog from the list via button 1775, or access more information and/or functionality via button 1730. Additional information about the selected dog is preferably also presented, including a dog hometown at display area 1780, a dog birthday at display area 1785, a dog age at display area 1790, and a dog weight at display area 1795. The dog information screen 1750 may also provide selectable functionality that enables a user to access more information and/or functionality via button 1730.

When a user chooses to add a new dog from the dog info management screen 1735, or to edit a selected dog from the dog information screen 1750, one or more edit dog info screens 2700,2705 may be displayed. For example, in a first edit dog info screen 2700, a user may add or edit a dog image, enter or edit a dog name, enter or edit the dog hometown, and/or finish and move to a second edit dog info screen 2705, while in the second edit dog info screen 2705, a user may enter or edit the dog's weight, enter or edit the dog's age, and/or enter or edit the dog's birthday. At least one of the edit dog info screens 2700,2705 may also provide selectable functionality that enables a user to load or take pictures via button 2710 and/or to access more information and/or functionality via button 1730. When editing is complete, the user may return to the entry screen 1105 via button 2715.

Returning to FIG. 10, the play management home screen 1220 preferably provides selectable functionality that enables the user to carry out such functions as selecting a different dog via button 1225, initiate a new game with the current dog via button 1230, review previous high score data for the current dog via button 1235, review information and/or data about previous games via button 1240, and/or access more information and/or functionality, such as game instructions, account information, and FAQs, via button 1245. In at least some embodiments, an image of the currently selected dog may be displayed together with the dog's name as shown at area 1250. If the user wants to select a different dog via button 1225, a dog selector screen 1255 may be displayed. The dog selector screen 1255 preferably includes selectable functionality that enables a user to choose (select) a dog from a list 1260 of previously-input dogs. The dog selector screen 1255 may also provide selectable functionality that enables a user to access more information and/or functionality, such as adding a new dog (such as by link 1265 to the dog information screen 1750), account information, and FAQs, via button 1270.

Figure 11:
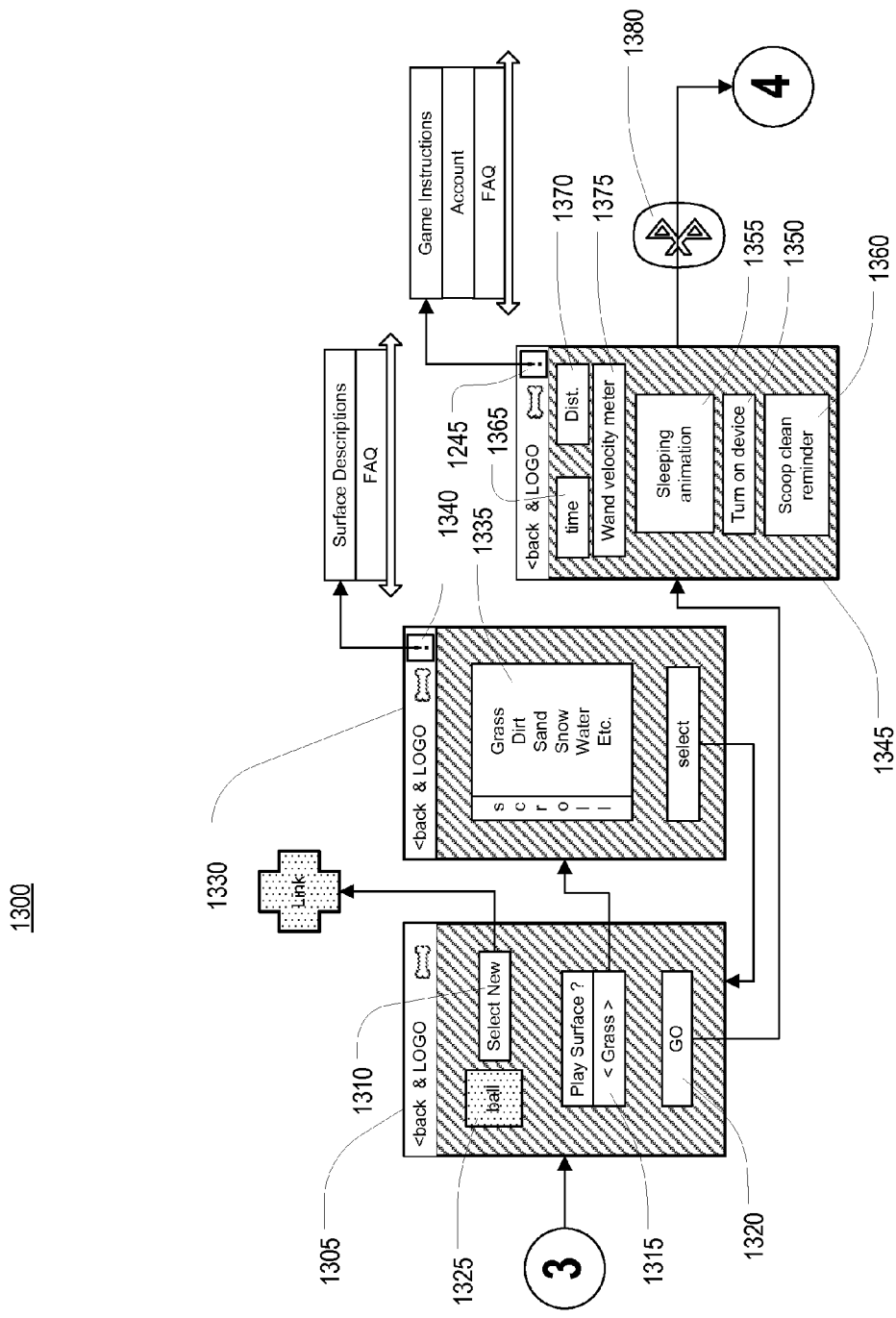
FIG. 11 is a partial wireframe diagram for a game settings portion of the exemplary user interface.

When a user chooses to initiate a new game from the play management home screen 1220, or selects a different dog from the list 1260 on the dog selector screen 1255, operation is transferred to a game settings portion 1300. In this regard, FIG. 11 is a partial wireframe diagram for a game settings portion 1300 of the exemplary user interface. When the game settings portion 1300 is entered, a game settings management screen 1305 may be displayed. As shown therein, the game settings management screen 1305 preferably provides selectable functionality that enables a user to select a different ball via button 1310, select a playing surface via button 1315, or activate a game using the selected ball and playing surface via a selectable button designated "GO" or the like 1320. In at least some embodiments, an image of the currently selected ball may be displayed as shown at area 1325.

When the user chooses to select a playing surface via button 1315, a playing surface selection screen 1330 may be displayed. The playing surface selection screen 1330 preferably includes selectable functionality that enables a user to choose (select) a type of playing surfaces from a list 1335 of different types of playing surface. Options may include, for example, grass, dirt, sand, snow, water, and the like. The playing surface selection screen 1330 may also provide selectable functionality that enables a user to access more information and/or functionality, such as surface descriptions and FAQs, via button 1340.

When the user chooses to activate a game session, such as by selecting via the "GO" button 1320 on the game settings management screen 1305, a ready-for-connection screen 1345 may be displayed. The ready-for-connection screen 1345 may be used to indicate, to the user, that the mobile device 60 is ready for communication with the ball launcher 40. The ready-for-connection screen 1345 preferably includes a verbal instruction or reminder 1350, to the user, to make sure that the ball launcher 40 is turned on or otherwise activated, and/or an animation 1355 that suggests, to the user, that the wand is "sleeping" and/or that the connection between the mobile device 60 and the ball launcher 40 is dormant. The ready-for-connection screen 1345 may also include a reminder 1360, to the user, to make sure to scoop and/or otherwise clean up after their dog as well as a time indicator 1365, a distance indicator 1370, a wand velocity indicator 1375. The ready-for-connection screen 1345 may also provide selectable functionality that enables a user to access more information and/or functionality, such as game instructions, account information, and FAQs, via button 1245.

Figure 12:
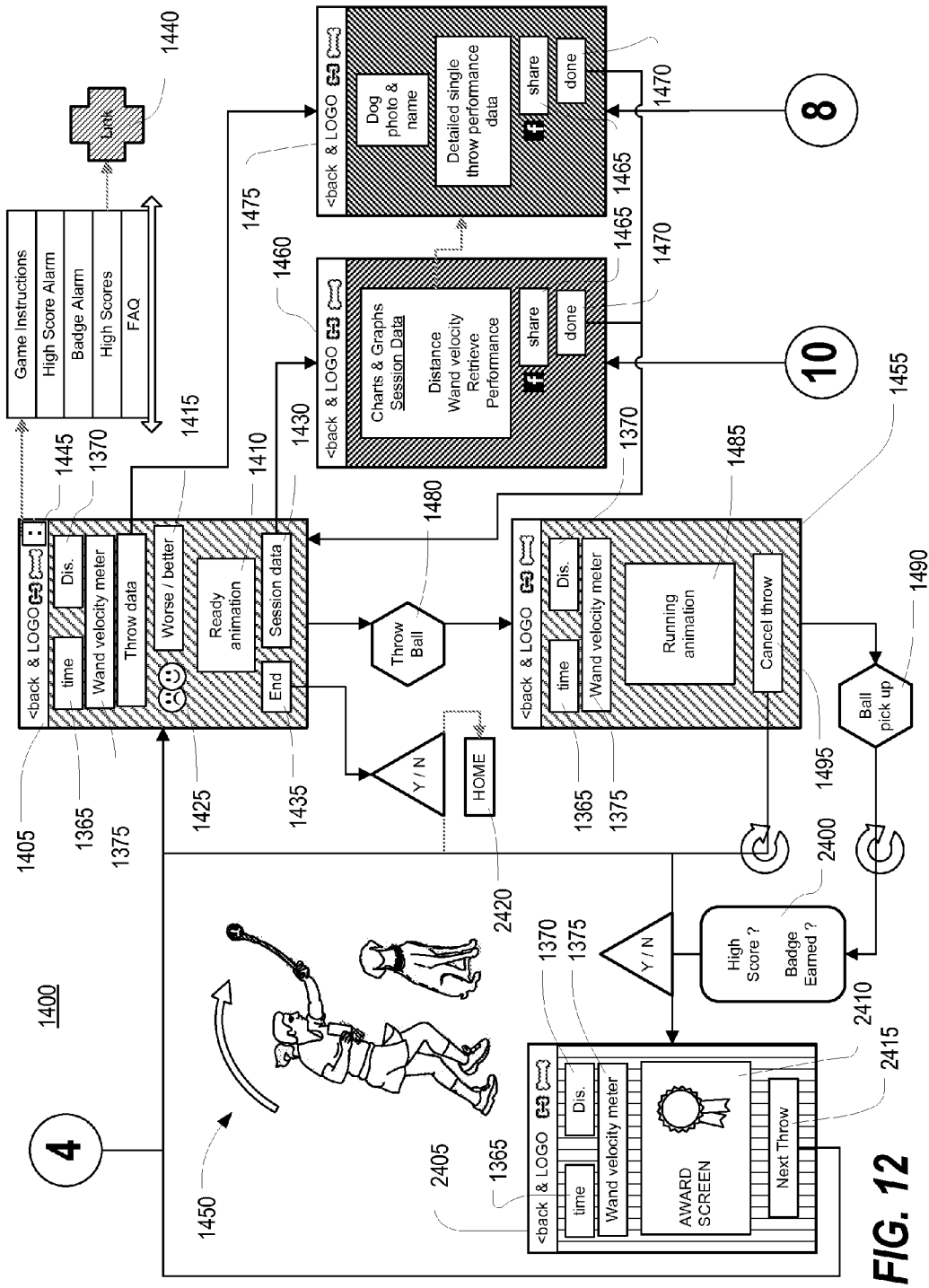
FIG. 12 is a partial wireframe diagram for an active game play portion of the exemplary user interface.

In at least some embodiments, the verbal instruction and/or reminder 1350 and/or the "sleeping" animation 1355, together with other portions of the ready-for-connection screen 1345, remain displayed until a user establishes a Bluetooth or other wireless connection 1380 between the mobile device 60 and the ball launcher 40. When such a connection 1380 is established, operation is transferred to an active game play portion 1400. In this regard, FIG. 12 is a partial wireframe diagram for an active game play portion 1400 of the exemplary user interface. When the active game play portion 1400 is first entered (and thereafter, when a throw process has completed and the mobile device 60 or system 10 is ready for another throw), a ready-for-next-throw screen 1405 may be displayed. As shown therein, the "sleeping" animation 1355 disappears and may be replaced by a "ready" animation 1410. Some other portions of the ready-for-next-throw screen 1405 are preferably arranged to match portions of the ready-for-connection screen 1345 to make the interface and system more intuitive. In the illustrated embodiment, the ready-for-next-throw screen 1405 includes the same time indicator 1365, distance indicator 1370, and wand velocity indicator 1375 as the ready-for-connection screen 1345. When the ready-for-next-throw screen 1405 first appears, these fields may show zeroes or otherwise have no actual data, but thereafter, as described below, are populated with actual data. The ready-for-next-throw screen 1405 may also include a verbal indication 1415 and/or a graphic indication 1420 of how the most recent throw compares, based on the throw data gathered, to one or more previous throw. The ready-for-next-throw screen 1405 preferably also includes selectable functionality that enables a user to access more detailed throw and/or retrieval data pertaining to a particular throw via button 1425, access performance information about the current game session via button 1430, end the current game session via button 1435, or access more information and/or functionality, such as game instructions, high score alarms, badge alarms, high score data (such as by link 1440 to a high score screen 1505, described elsewhere herein), and FAQs, via button 1445.

When the ready-for-next-throw screen 1405 is displayed, the system is ready for the user to throw the sensing ball 12. Action is generally initiated by loading the sensing ball 12 into the ball launcher 40 (if not already loaded) and then using the ball launcher 40 to throw the sensing ball 12 in a desired direction and trajectory as illustrated at 1450. It will be appreciated that a wide variety of techniques may be utilized at the preference of the user, and that different techniques, directions, and trajectories will result in different paths and distances traveled by the sensing ball 12. As the sensing ball 12 is thrown, travels, and is returned by the dog, a variety of data is gathered, displayed, stored, and/or analyzed by the system. As represented at 1480, throwing the sensing ball 12 preferably causes the ball to transition to an active throw screen 1455, wherein the "ready" animation 1415 disappears and may be replaced by a "running," animation, "throwing" animation, or other indication 1485 that a throw/retrieval process is actively ongoing.

The user interface remains in the active throw state until the sensing ball 12 is picked up and/or returned to the user, as represented at step 1490. Data gathered during the process is preferably saved and analyzed. In at least some embodiments, including the illustrated embodiment, one or more further screens may be displayed if, as shown at step 2400, the throw/retrieval data is determined to meet the criteria for a new high score, a badge, or other game-related achievement. If not, operation returns to the ready-for-next-throw screen 1405, but in at least some embodiments with the previously-mentioned data continuing to be displayed for the throw. The user may also force operation to return to the ready-for-next-throw screen 1405 via a selectable button designated "cancel throw" or the like 1495.

If at step 2400 it is determined that an achievement has been accomplished, an appropriate achievement screen 2405 may be displayed. Such an achievement screen 2405 may include, in addition to the previously mentioned throw data, one or more display area 2410 containing information relating to the particular achievement that has been accomplished. Accomplishments may pertain to details of the particular throw, a series or collection of throws, details related to geographical location (such as a particular park or other locale), counting totals for throws (e.g., lifetime total number of throws, number of throws in a locale, number of throws of a minimum distance, or the like), or any other data of which the system is aware. When the user is finished reviewing the achievement information, he or she may return to the ready-for-next-throw screen 1405 via a selectable button designated "next throw" or the like 2415.

When a user chooses to access performance information about the current game session from the ready-for-next-throw screen 1405, one or more session performance screen 1460 may be displayed. The session performance screens 1460 may display information and/or data regarding such performance characteristics as distances thrown, wand velocities, retrieval performance, and/or the like. Charts, graphs, and other graphical elements may be utilized. One or more of the session performance screens 1460 preferably also includes selectable functionality that enables a user to select a particular throw and access more detailed throw and/or retrieval data pertaining thereto (such as via one or more detailed throw performance screens 1475, described below), share performance information and/or data with social media platforms (such as Facebook®, Twitter®, or the like) via a button 1465, or return to the ready-for-next-throw screen 1405 via a selectable button designated "done" or the like 1470.

When a user chooses to access more detailed throw and/or retrieval data pertaining to a particular throw data from the ready-for-next-throw screen 1405, or from the session performance screens 1460, one or more detailed throw performance screens 1475 may be displayed. The throw performance screens 1475 may display more detailed information and/or data regarding throw performance characteristics. Charts, graphs, and other graphical elements may be utilized. One or more of the throw performance screens 1475 preferably also includes selectable functionality that enables a user to share throw performance information and/or data with social media platforms (such as Facebook®, Twitter®, or the like), via a button 1465, or return to the ready-for-next-throw screen 1405 via a selectable button designated "done" or the like 1470.

In the illustrated embodiment, the user interface continues to operate in the active game play portion 1400 thereof until the user chooses to end the active game via the "end" button on the ready-for-next-throw screen 1405. Such arrangement may be preferred due to the role of the ready-for-next-throw screen 1405 as the primary screen for managing the active game process, but it will be appreciated that one or more of the other screens 1455,1460,1475,2405 may alternatively or additionally be provided with such functionality. When the user ends the active game, operation preferably returns to the entry screen 1105 in the entry screen portion 1100 of the user interface, as represented at step 2420. Alternatively, operation may return to a screen in the play management portion 1200, or some other logical destination.

Figure 13:
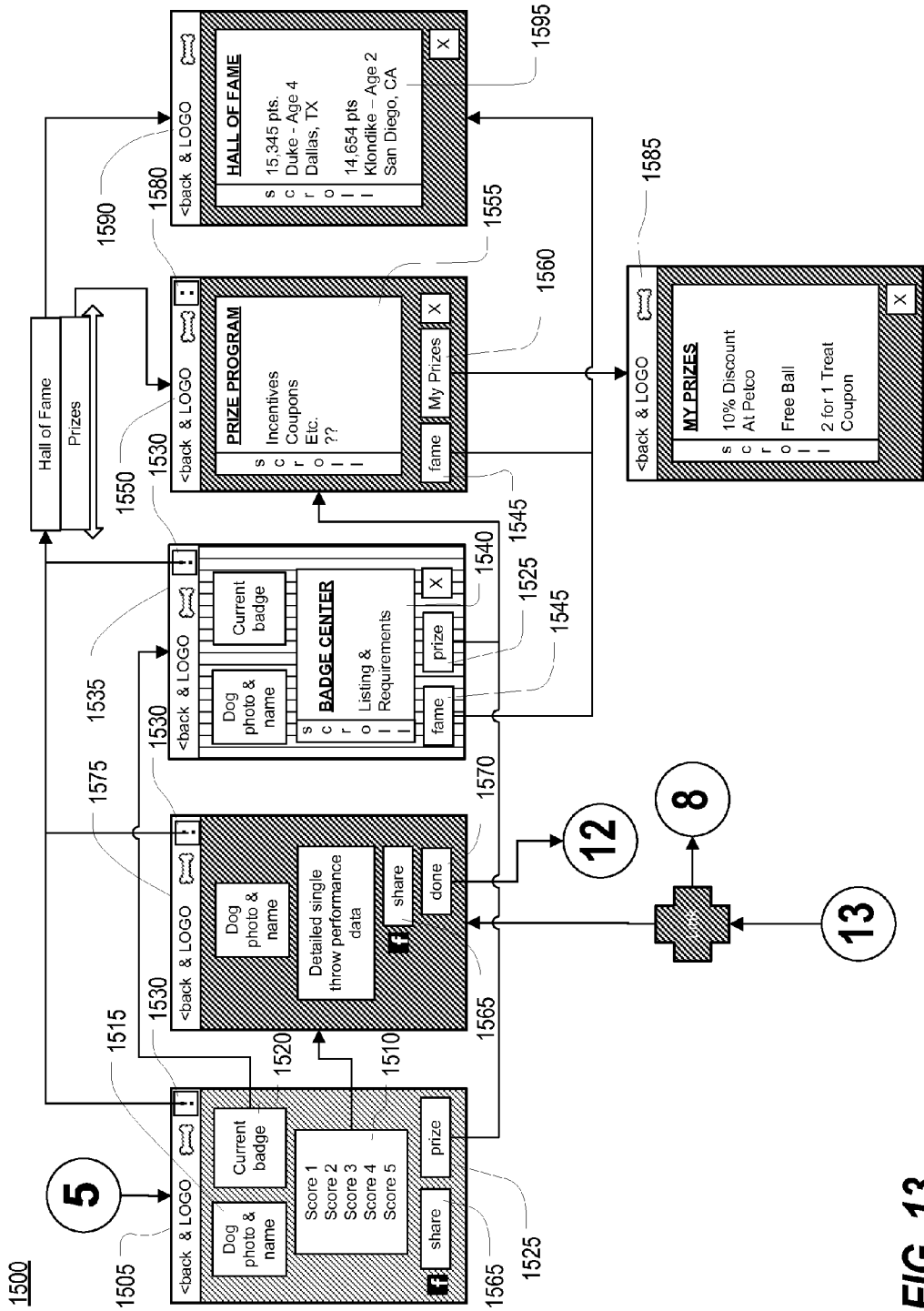
FIG. 13 is a partial wireframe diagram for a score and rewards portion of the exemplary user interface.

In at least some embodiments, additional functionality pertaining to score and reward management is also provided by the user interface. For example, FIG. 13 is a partial wireframe diagram for a score and rewards portion 1500 of the exemplary user interface. The score and rewards portion 1500 may be accessed, for example, from a screen in the play management portion 1200 of the user interface, such as the play management home screen 1220. When the score and rewards portion 1500 of the user interface is entered, a high score screen 1505 may be displayed. The high score screen 1505 preferably provides a list 1510 of high scores either for a particular dog (selectable, in the illustrated embodiment, from the dog selector screen 1255 in the play management portion 1200), which may be identified in a dog display area 1515, or for the user regardless of dog (not illustrated). In the illustrated embodiment, the scores are scores for individual throws and/or retrievals, it will be appreciated that a high score listing may alternatively or additionally be provided for sessions, dogs, geographic locations, or the like. The high score screen 1505 preferably also includes selectable functionality that enables the user to carry out such functions as selecting a throw/retrieval score, from the list 1510, so as to access more detailed throw and/or retrieval data pertaining thereto (such as via one or more detailed throw performance screens 1475, described below), access information and/or data about a particular badge or other achievement via button 1520, access information and/or data about prizes via button 1525, share performance information and/or data with social media platforms (such as Facebook®, Twitter®, or the like) via button 1565, or access more information and/or functionality, such as "hall of fame" or prize information, via button 1530.

When a user chooses to access detailed throw and/or retrieval data pertaining to a particular throw score from the high score list 1510, one or more detailed throw performance screens 1575 may be displayed. The throw performance screens 1575, which may be similar or identical to the throw performance screens 1475 described previously, may display more detailed information and/or data regarding throw performance characteristics. Charts, graphs, and other graphical elements may be utilized. One or more of the throw performance screens 1575 preferably also includes selectable functionality that enables a user to share throw performance information and/or data with social media platforms (such as Facebook®, Twitter®, or the like), via a button 1565, return to the play management home screen 1220 via a selectable button designated "done" 1570, and/or access more information and/or functionality, such as "hall of fame" or prize information, via button 1530.

When a user chooses to access information and/or data about a particular badge or other achievement via button 1520 from the high score screen 1505 or elsewhere, one or more detailed badge information screens 1535 may be displayed. The badge information screens 1535 may display more detailed information about a particular badge. The badge about which the detailed information is displayed may be the most recent or current badge, a badge selected from a list, a badge that has not yet been achieved, and/or the like. The badge information screens 1535 may include a listing 1540 of badges that have been achieved and/or badges that are available to be achieved. The badge information screens 1535 may also include selectable functionality that enables a user to access information and/or functionality regarding a prize program via button 1525, access a hall of fame listing high scoring system participants via button 1545, and/or access more information and/or functionality via button 1530.

When a user chooses to access information and/or data about prizes via button 1525 from the high score screen 1505 or elsewhere, one or more prize program screens 1550 may be displayed. The prize program screens 1550 may display detailed information about one or more of various prize programs. The prize program screens 1550 may include a listing 1555 of prizes that may be available, including incentives, coupons, merchandise, and others. The prize program screens may also include selectable functionality that enables a user to access information and/or functionality regarding the user's prizes via button 1560, access a hall of fame listing high scoring system participants via button 1545, and/or access more information and/or functionality via button 1580.

When a user chooses to access information and/or functionality regarding the user's own prizes via button 1560 from the prize program screens 1550 or elsewhere, one or more user prize screens 1585 may be displayed. The prize program screens 1550 may display a listing and/or detailed information about particular prizes awarded to the user. Examples may include discounts at pet supply stores, a free ball or other merchandise, a coupon for a treat or other merchandise, and the like.

When a user chooses to access a hall of fame listing high scoring system participants via button 1545 from the badge information screens 1535 or elsewhere, one or more hall of fame screens 1590 may be displayed. The hall of fame screens 1590 may display one or more lists of high scoring system participants. In various embodiments, the participants may be humans, dogs, or both. By way of example, the illustrated hall of fame screens 1590 include a listing 1595 of the highest scoring dogs in the country or world.

Figure 14:
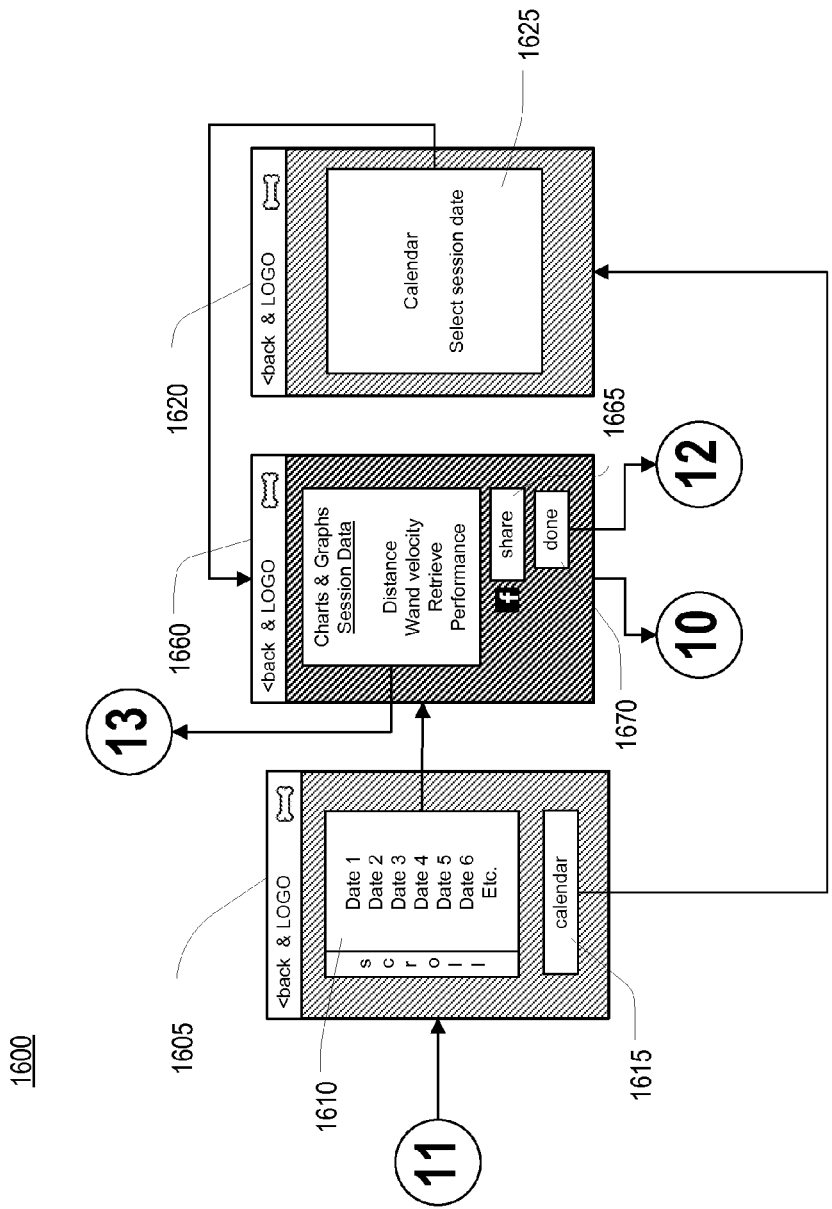
FIG. 14 is a partial wireframe diagram for a play history portion of the exemplary user interface.

In at least some embodiments, additional functionality pertaining to game play history is also provided by the user interface. For example, FIG. 14 is a partial wireframe diagram for a play history portion 1600 of the exemplary user interface. When the play history portion 1600 of the user interface is entered, a session listing screen 1605 may be displayed. The session listing screen preferably provides a list 1610 of some or all previous game sessions and/or selectable functionality that enables a user to access, via button 1615, a calendar screen 1620 that presents a daily, weekly, monthly, yearly or other calendar 1625 that identifies days or times on or at which a session was played. When the user selects a particular session, either from the session list 1610 or from the calendar 1625, one or more session performance screen 1660 may be displayed. The session performance screens 1660, which may be similar or identical to the session performance screens 1460 described previously, may display information and/or data regarding such performance characteristics as distances thrown, wand velocities, retrieval performance, and/or the like. Charts, graphs, and other graphical elements may be utilized. One or more of the session performance screens 1660 preferably also includes selectable functionality that enables a user to select a particular throw and access more detailed throw and/or retrieval data pertaining thereto (such as via one or more detailed throw performance screens 1475, described elsewhere herein), share performance information and/or data with social media platforms (such as Facebook®, Twitter®, or the like) via a button 1665, or return to the play management home screen 1220 via a selectable button designated "done" or the like 1670.

Figure 16:
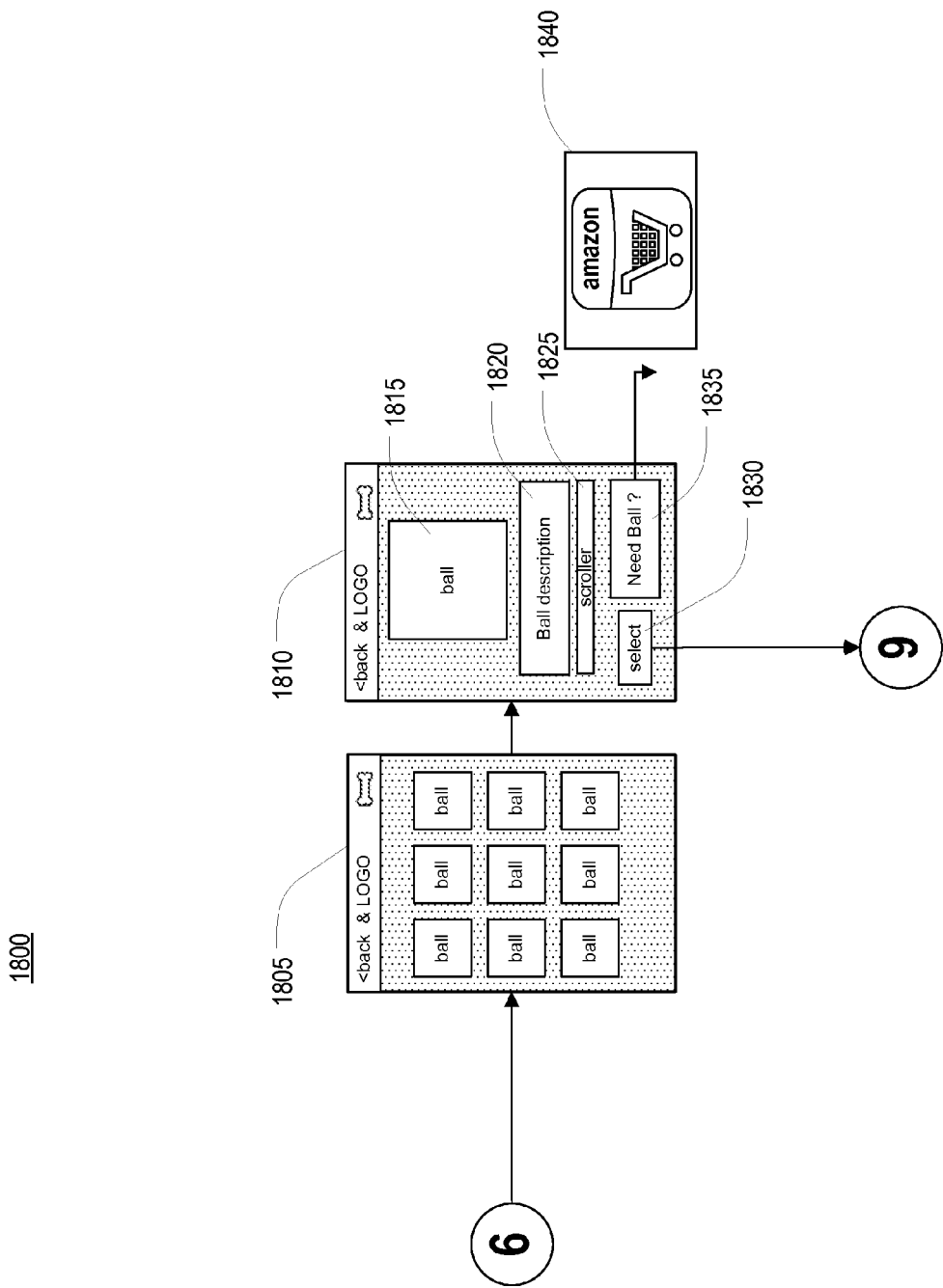
FIG. 16 is a partial wireframe diagram for a ball selector portion of the exemplary user interface.

FIG. 16 is a partial wireframe diagram for a ball selector portion 1800 of the exemplary user interface. In the illustrated embodiment, the ball selector portion 1800 may be accessed from the entry screen 1105 in the entry screen portion 1100 of the user interface. Alternatively or additionally, however, such functionality may be access from other portions of the interface, such as from a screen in the play management portion 1200 of the user interface. When the ball selector portion 1800 of the user interface is entered, a ball menu screen 1805 may be displayed. The ball menu screen 1805 presents textual, photographic, iconic, or other identifiable information about different balls 12 available for use in or with the system of the present invention. For example, in FIG. 16, nine different balls 12 are presented. When a user selects a particular ball, a ball information screen 1810 is preferably presented, with such screen providing specific information about the selected sensing ball 12. The specific information may include, without limitation, a picture (photographic or otherwise) 1815 of the ball, a written description 1820 of the ball (accompanied in at least some embodiments with functionality 1825 to scroll through such description or access a new screen so that the description may be viewed more easily), and selectable functionality that enables a user to choose that ball for further game play via button 1830, order the selected ball via button 1835, or return to the ball menu screen 1805 via button (not shown). Merchandise ordering functionality may be provided, for example, via Amazon® or other shopping cart functionality as represented at step 1840.

Figure 17:
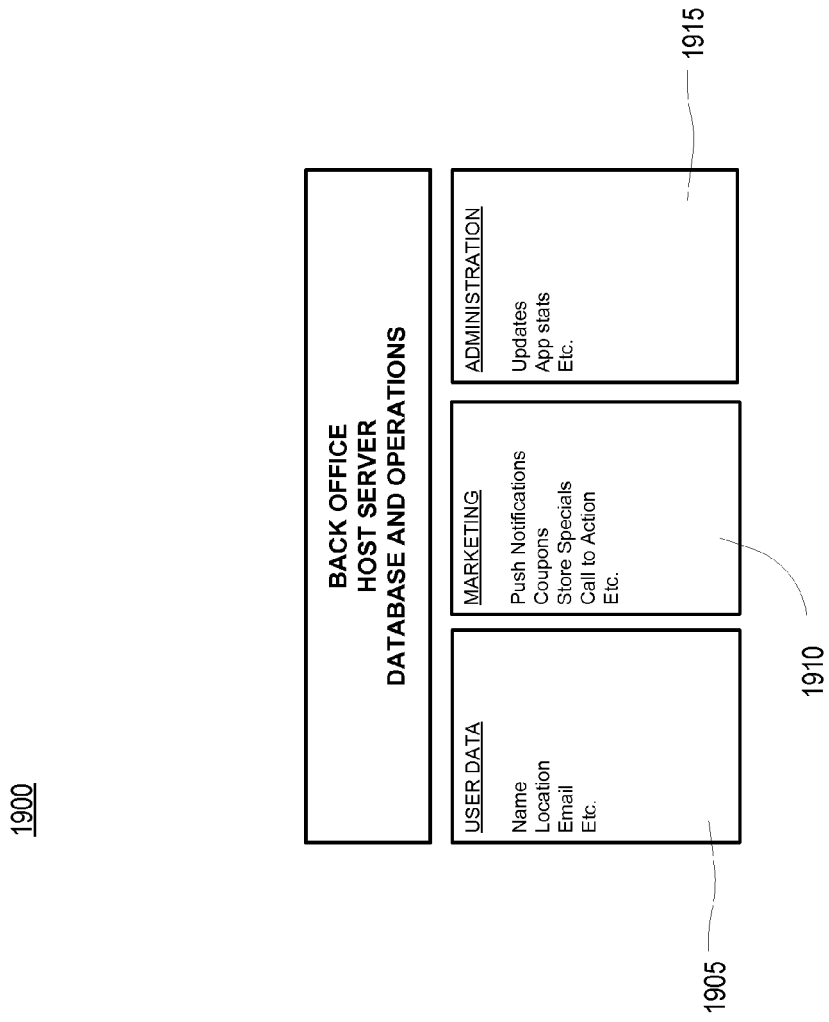
FIG. 17 is a block diagram illustrating back office and host server functionality of the system of the present invention.

FIG. 17 is a block diagram illustrating back office and host server functionality of the system of the present invention. Some or all of the functionality of FIG. 17 is accessed or used by the user interface. Functionality includes user data functionality 1905, marketing functionality 1910, and administration functionality 1915. User data functionality 1905 primarily includes a database and data management tools, with stored data including names, locations, email addresses, and the like. Marketing functionality 1910 includes functionality to handle push notifications, coupons, store specials, calls to action, and the like. Administration functionality 1915 includes update functionality, application statistics, and the like.

Figure 18:
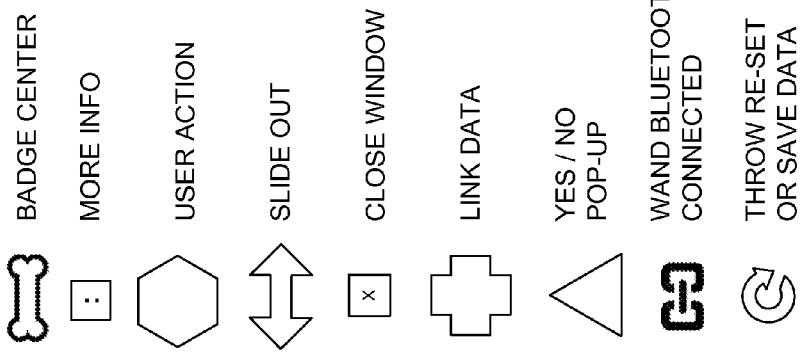
FIG. 18 is a symbol key to the wireframe diagram of FIGS. 9-16.

FIG. 18 is a symbol key 2000 to the wireframe diagram of FIGS. 9-16. Some or all of the symbols shown in the key 2000 are used in the various other diagrams, and it will be understood that such symbols may have the meanings described therein.

It will be appreciated that while the application software programs and user interfaces described herein are representative designs for the gathering, use, manipulation and display of data obtained and transmitted via the components of the present invention, there are many and endless variants of using and displaying data obtained from the system, and the present invention should not be limited to that which is disclosed herein.

Figure 19:
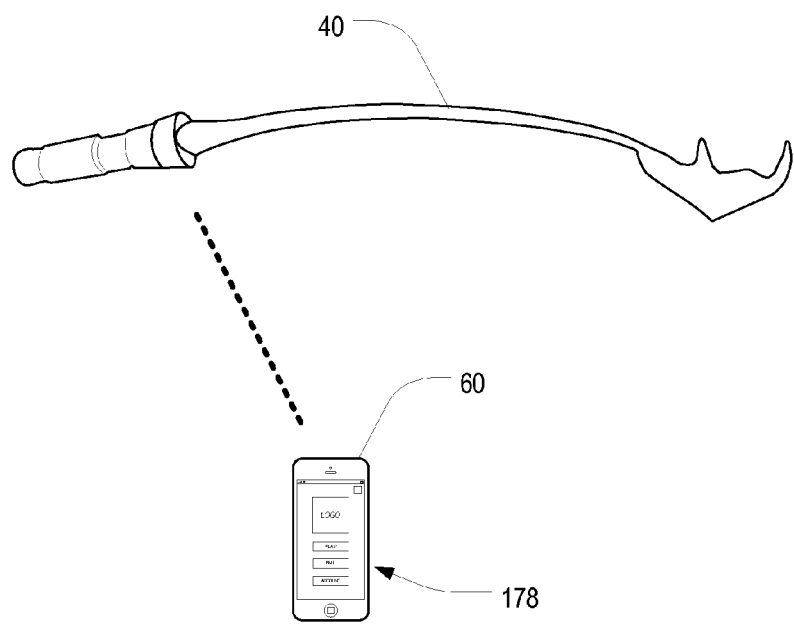
FIG. 19 is a view of another pet toy launching system for use with mobile devices in accordance with one or more preferred embodiments of the present invention.
Figure 19:
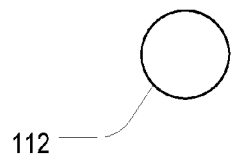
Figure 20:
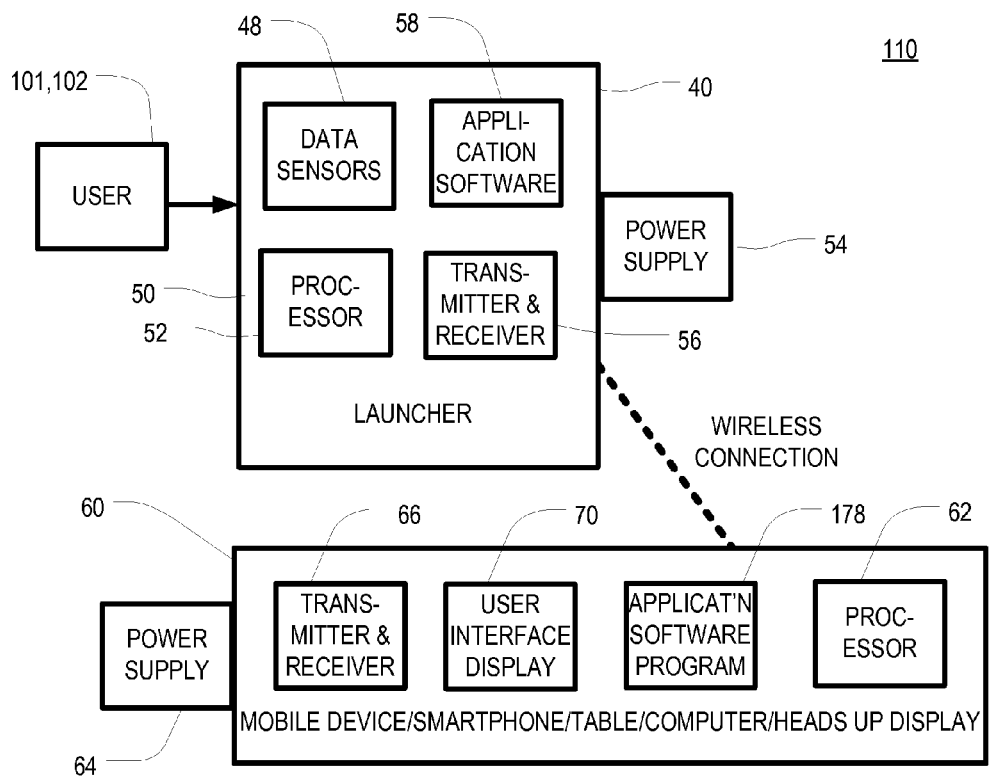
FIG. 20 is a block diagram of the system of FIG. 19.

FIG. 19 is a view of another pet toy launching system 110 for use with mobile devices in accordance with one or more preferred embodiments of the present invention, and FIG. 20 is a block diagram of the system 110 of FIG. 19. As shown therein, the alternative pet toy launching system 110 includes a ball or other projectile 112, a ball launcher 40, and a mobile device 60, on which an application software program 178 is installed. In this alternative system 110, the pet does not wear any special apparatus, and the ball 112 has no electronic components for data collection and does not communicate with any other smart enabled dog product devices. Instead, the system 110 of FIGS. 19 and 20 is a standalone system with fetch data generated by the wand and the mobile device. Because the ball 112 has no special qualities, it is contemplated that in at least some commercial embodiments, the launcher and/or application software program for the mobile device 60 may be offered for sale without any ball 112, in which case the user 101,102, may provide their own ball or other projectile.

Furthermore, although the mobile device 60 may use one or more communication network and may communicate with a remote server, such communications need not be part of the system 110. Functionality of the application software program 178 is more limited than the application software program 78 of the system 10 of FIG. 2, but the system is less expensive to produce and does not depend on special equipment or accessories worn by the dog 104 or housed in the ball 112. For this system 110, the software 178 located on the mobile device 60 could include algorithms to calculate and display fetch data such as ball distances and return times, using static and dynamic data. Such algorithms could be used in place of data that would have been provided by accessory items such as the dog-wearable sensing apparatus 20 and sensing ball 12 of the system of FIG. 1. Use and operation of the system 110 is otherwise similar to that of the system 10 of FIG. 2. It will also be appreciated that other alternative systems (not shown) may be created by eliminating other components shown in FIG. 2 or by shifting some of the subcomponents and functionality around.

Figure 21:
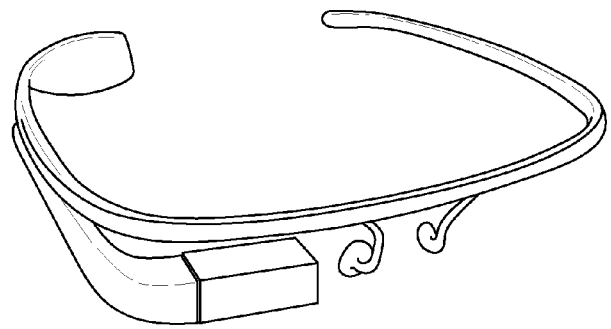
FIG. 21 is a perspective view of a mobile device in the form of a wearable heads up display.
Figure 22:
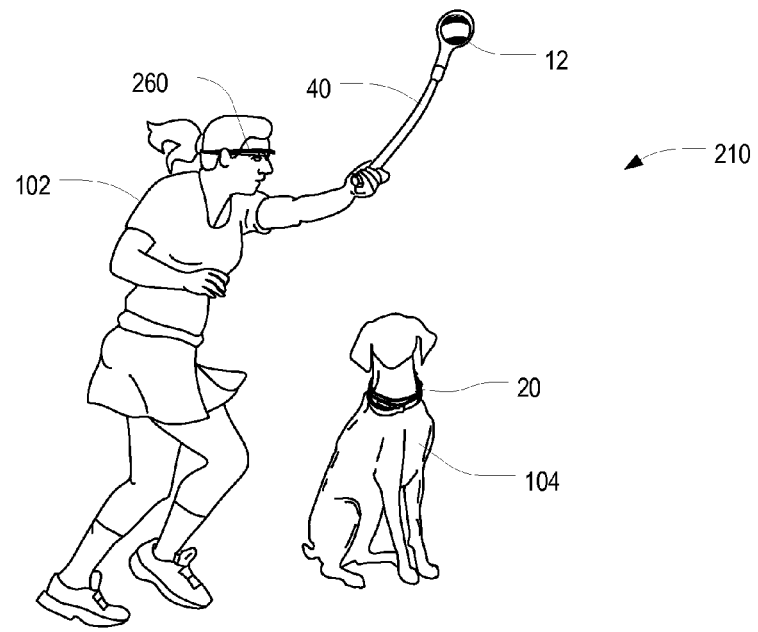
FIG. 22 is an environmental view of a user using the heads up display of FIG. 21 as part of another alternative pet toy launching system in accordance with one or more preferred embodiments of the present invention.

As noted previously, the mobile device may take a variety of form factors. In another example, FIG. 21 is a perspective view of a mobile device 260 in the form of a wearable heads up display, and FIG. 22 is an environmental view of a user 102 using the heads up display 260 of FIG. 21 as part of another alternative pet toy launching system 210 in accordance with one or more preferred embodiments of the present invention. Examples of heads up displays or mobile devices include; Google Glass, Oculus VR®, Oakley's Smart Glasses, iWear VR920, Recon Instruments HUD eyewear, VUZIX STAR 1200, SONY HMZ T1, Brother Airscouter, EPSON MOVERIO BT-100 Apple's Smart Glasses, or the like. As shown in FIG. 22, this alternative pet toy launching system 210 includes a ball or other projectile 12, a dog-wearable sensing apparatus 20, a ball launcher 40, the heads up display 260 of FIG. 21, on which an application software program (not illustrated) is installed, and a server 16 that may accessed via one or more communication network (not shown). It will also be appreciated that heads up displays may be used in systems that do not involve a dog-wearable sensing apparatus or sensor-enabled ball, such as that shown in FIGS. 19 and 20, and in other variations. Other than the operation and control of the user interfaces (including a graphical user interface) of the heads up display 260, the system 210, including the application software program operating on the heads up display 260, may be similar to the system 10 of FIGS. 1 and 2.

Figure 23:
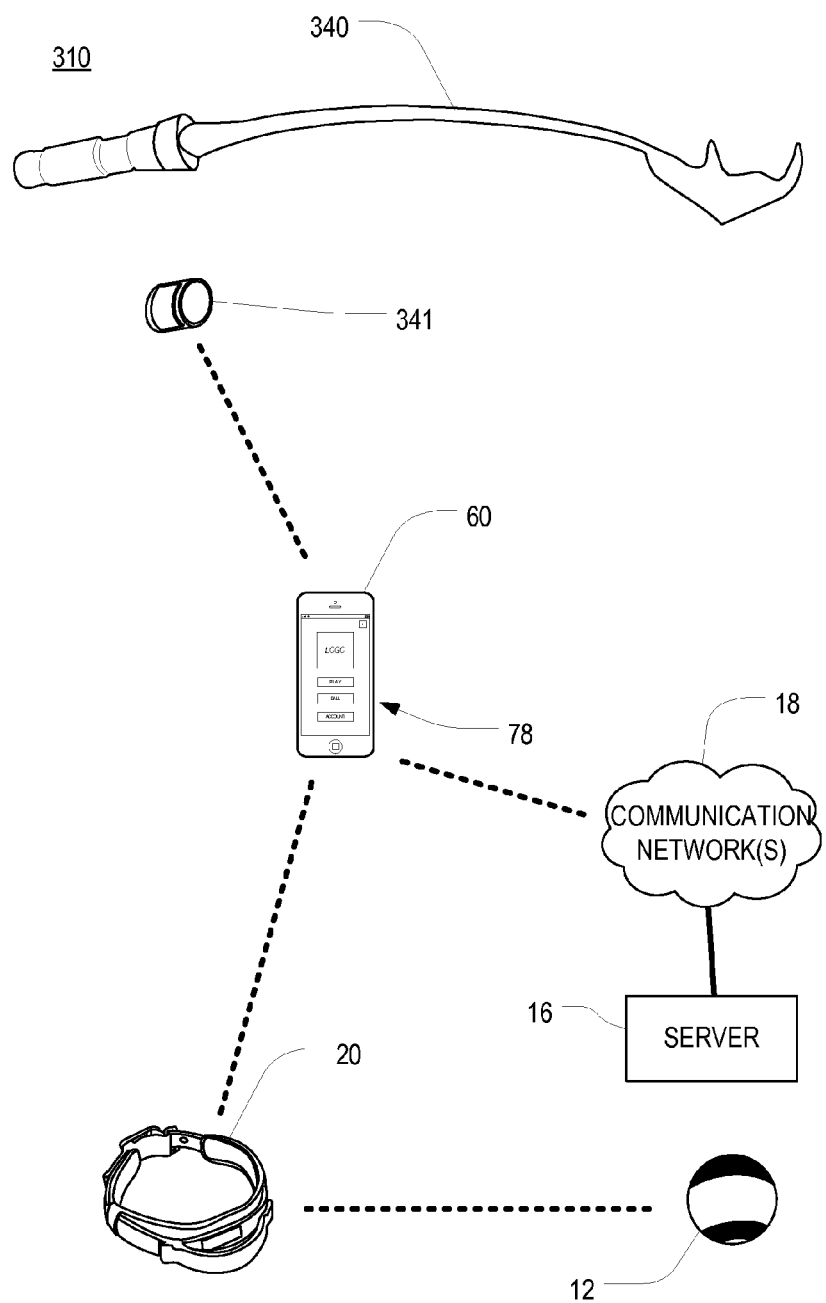
FIG. 23 is a view of an alternative pet toy launching system for use with mobile devices in accordance with one or more preferred embodiments of the present invention.
Figure 24:
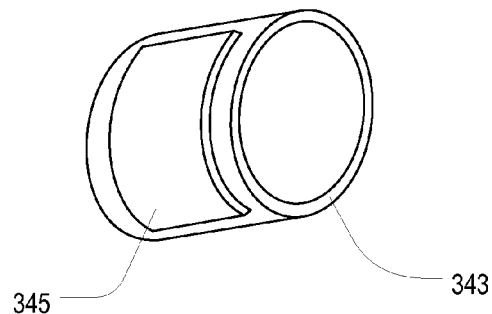
FIG. 24 is an enlarged view of the attachable sensor unit of FIG. 23.
Figure 25:
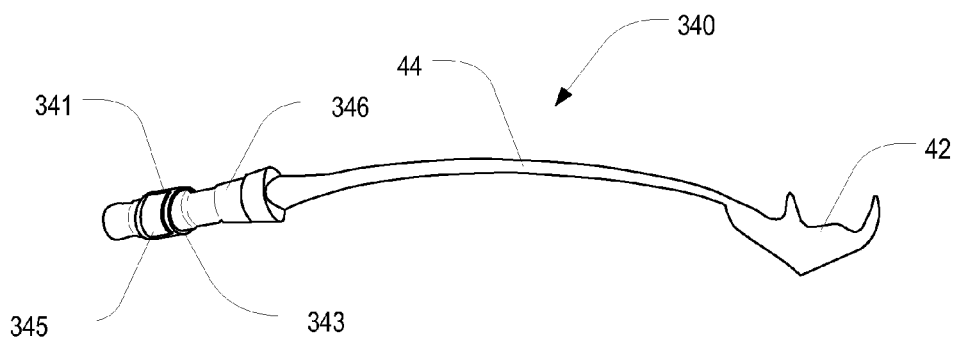
FIG. 25 is a view of the attachable sensor unit installed around the handle of the ball launcher.

It will be appreciated that in alternative embodiments, a conventional ball launcher 340 may be utilized by combining it with an attachable sensor unit 341. In this regard, FIG. 23 is a view of an alternative pet toy launching system 310 for use with mobile devices 60 in accordance with one or more preferred embodiments of the present invention. This system 310 is similar to that of FIG. 1, but utilizes an attachable sensor unit 341. In this embodiment, the ball launcher 340, which is conventional, includes a ball holder 42, a shaft 44, and a handle 346, wherein the attachable sensor unit 341 may be attached to the handle 346. FIG. 24 is an enlarged view of the attachable sensor unit 341 of FIG. 23, and FIG. 25 is a view of the attachable sensor unit 341 installed around the handle 346 of the ball launcher 340. The attachable sensor unit 341 may comprise, for example, a cuff or strap 343 that may be wrapped around the handle 346. In at least some embodiments, the sensor unit 341 may also, after attachment, be detached from the ball launcher 340 without damage to the sensor unit 341 or ball launcher 340. The electronic components may be carried in a housing 345 that is attached to the cuff or strap 343. It will be appreciated, however, that the particular attachable sensor unit 341 shown in FIGS. 23-25 is exemplary only, and that the shape, dimensions, elements, and general form factor of the attachable sensor unit 341, as well as any decorative features, may be varied considerably without departing from the scope of the present invention. The electronic components themselves may be similar or identical to those described with regard to the ball launcher 40 of FIG. 1.

Although not specifically illustrated herein, in some embodiments, a ball or other projectile may be equipped to communicate directly with the mobile device 60 and/or the ball launcher 40 (or attachable sensor unit 341). In some of these embodiments, a dog-wearable sensing apparatus may communicate through such a ball to the mobile device 60. It will be appreciated that the present invention encompasses any combination of smart-enabled ball launcher (or attachable sensor unit), dog-wearable sensing apparatus, and/or ball, whether or not specifically disclosed herein, in combination with the mobile device and application software program. Furthermore, it will be appreciated that the present invention encompasses any of these combinations both with and without an interact- or other network-linked server, whether or not specifically disclosed herein.

The systems and related devices described herein may be used all together, separately, or in any combination. The systems may be used for pet training or to participate in various play-patterns or games with the pet, based on the use of the various components of the present invention.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A pet toy launching system for use with mobile devices, comprising:
   a handheld, manually manipulated ball launcher having a ball holder, a shaft supporting the ball holder, and a handle supporting the shaft, and including a transmitter;
   a dog-wearable sensing apparatus, including a transmitter;
   a ball or other projectile, configured to be cradled in the ball holder and manually thrown therefrom, including a transmitter;
   a mobile device, on which an application software program is installed; and
   one or more sensors, each of which is disposed in, and electrically connected to the transmitter in, one of the ball launcher, the dog-wearable sensing apparatus, and/or the ball;
   wherein the mobile device communicates with at least one of the ball launcher, the dog-wearable sensing apparatus, and/or the ball; and
   wherein the application software program presents a user interface, to a user, such that a game may be carried out, via the application software program, when the dog-wearable sensing apparatus is worn by a dog and the ball launcher is utilized to throw the ball or other projectile for the dog to retrieve.

2. A pet toy launching system for use with mobile devices, comprising:
   a handheld, manually manipulated ball launcher having a ball holder, a shaft supporting the ball holder, and a handle supporting the shaft;
   a sensor unit that may be attached to the ball launcher and that includes a transmitter, wherein, in a first state, the sensor unit is attached by a user to the ball launcher such that the sensor unit is carried by the ball launcher while the ball launcher is utilized to throw a ball or other projectile and, in a second state, the sensor unit is detached by a user from the ball launcher such that the sensor unit is no longer carried by the ball launcher;
   a dog-wearable sensing apparatus, including a transmitter;
   a ball or other projectile, configured to be cradled in the ball holder and manually thrown therefrom, including a transmitter;
   a mobile device, on which an application software program is installed; and
   one or more sensors, each of which is disposed in, and electrically connected to the transmitter in, one of the ball launcher sensor unit, the dog-wearable sensing apparatus, and/or the ball;
   wherein the mobile device communicates with at least one of the ball launcher sensor unit, the dog-wearable sensing apparatus, and/or the ball; and
   wherein the application software program presents a user interface, to a user, such that a game may be carried out, via the application software program, when the dog-wearable sensing apparatus is worn by a dog, the sensor unit is attached to the ball launcher, and the ball launcher is utilized to throw the ball or other projectile for the dog to retrieve.

3. A pet toy launching system for use with mobile devices, comprising:
   a handheld, manually manipulated ball launcher having a ball holder, a shaft supporting the ball holder, and a handle supporting the shaft, and including a sensor and a transmitter, the sensor being electrically connected to the transmitter;
   a ball or other projectile, configured to be cradled in the ball holder and manually thrown therefrom; and
   a mobile device, on which an application software program is installed;
   wherein the mobile device communicates with the ball launcher; and
   wherein, when the ball launcher is utilized to throw the ball or other projectile for a dog to retrieve, the application software program:
      calculates fetch data pertaining to ball travel distance and ball return times based on information transmitted from the ball launcher sensor and on information from the mobile device, and
      presents a user interface, to a user, such that a game may be carried out, via the application software program, based on the calculated fetch data.

4. The pet toy launching system of claim 2, wherein the sensor unit is attached to the ball launcher via a cuff or strap.

5. The pet toy launching system of claim 3, wherein the application software program displays the calculated fetch data to the user via the user interface.

6. The pet toy launching system of claim 3, wherein the application software program displays a score to the user based on the calculated fetch data via the user interface.

* * * * *